Jan. 4, 1966 R. W. FRANK 3,227,893

REVERSIBLE COUNTER HAVING IDENTICAL SEQUENCE OF COUNTING STATES DURING FORWARD AND REVERSE COUNTING

Filed Oct. 29, 1962 5 Sheets-Sheet 1

INVENTOR.
RICHARD W. FRANK
BY Rines and Rines
ATTORNEYS

Jan. 4, 1966

R. W. FRANK 3,227,893

REVERSIBLE COUNTER HAVING IDENTICAL SEQUENCE OF COUNTING STATES DURING FORWARD AND REVERSE COUNTING

Filed Oct. 29, 1962

5 Sheets-Sheet 2

INVENTOR.
RICHARD W. FRANK
BY Rines and Rines
ATTORNEYS

INVENTOR.
RICHARD W. FRANK
BY Rines and Rines
ATTORNEYS

INVENTOR
RICHARD W. FRANK

BY Rines and Rines

ATTORNEYS

Jan. 4, 1966

R. W. FRANK 3,227,893

REVERSIBLE COUNTER HAVING IDENTICAL SEQUENCE OF COUNTING STATES DURING FORWARD AND REVERSE COUNTING

Filed Oct. 29, 1962

5 Sheets-Sheet 5

INVENTOR
RICHARD W. FRANK

BY *Rines and Rines*

ATTORNEYS

United States Patent Office 3,227,893

Patented Jan. 4, 1966

3,227,893

REVERSIBLE COUNTER HAVING IDENTICAL SEQUENCE OF COUNTING STATES DURING FORWARD AND REVERSE COUNTING

Richard W. Frank, Concord, Mass., assignor to General Radio Company, West Concord, Mass., a corporation of Massachusetts Filed Oct. 29, 1962, Ser. No. 233,563
14 Claims. (Cl. 307—88.5)

The present invention relates to electric-impulse counters, and, more particularly, to circuits adapted for enabling reversible counting of impulses and the like.

Numerous proposals have been advanced for rendering impulse-counting circuits reversible in their counting operation. Included in such prior-art proposals are reversible counters for operation with decade systems having different weighting codes. With the 1–2–4–8 weighting code, for example, complex circuitry is required to enable such reversible counting, as disclosed, for example, in United States Letters Patent No. 2,841,705, issued July 1, 1958 to N. A. Moerman. In addition, circuits of the character disclosed in the said patent require the use of at least an additional or supplemental stage for enabling reverse counting in the 1–2–4–8 weighting code; such additional stage serving as the first stage in the reverse counting operation because the first stage is inherently in the "0" instead of the "1" state at the commencement of reverse counting. As another illustration, the 1–2–4–2 weighted code is employed in a reversible decade counter of the type described by I. Scollar, Electronic Engineering, September 1961, pages 597–599, "An Economical Reversible Transistor Decade Counter." In systems of this character, however, the switching sequence is not the same both in forward and reverse counting, though the circuit does disclose the use of diode gates to connect either to the "0" side of a given flip-flop stage for forward counting (addition), or from the "1" side of the flip-flop stage for reverse counting (subtraction).

An object of the present invention, accordingly, is to provide a new and improved reversible counting circuit that shall not be subject to the above-described disadvantages of complexity, additional or supplemental stages, or different forward and reverse counting sequences, but that shall, to the contrary, employ precisely the same predetermined switching sequence in forward counting as in reverse counting and precisely the same predetermined assignment of weighting code to the successive stages, all without the necessity for supplemental flip-flop stages.

A further object is to provide a novel counter of the above-described character that employs a preferred 1–2–4–2 weighting code.

Still another object is to provide a new and improved counter of more general utility, also.

Other and further objects will be explained hereafter and will be more particularly pointed out in the appended claims.

Figure 1:
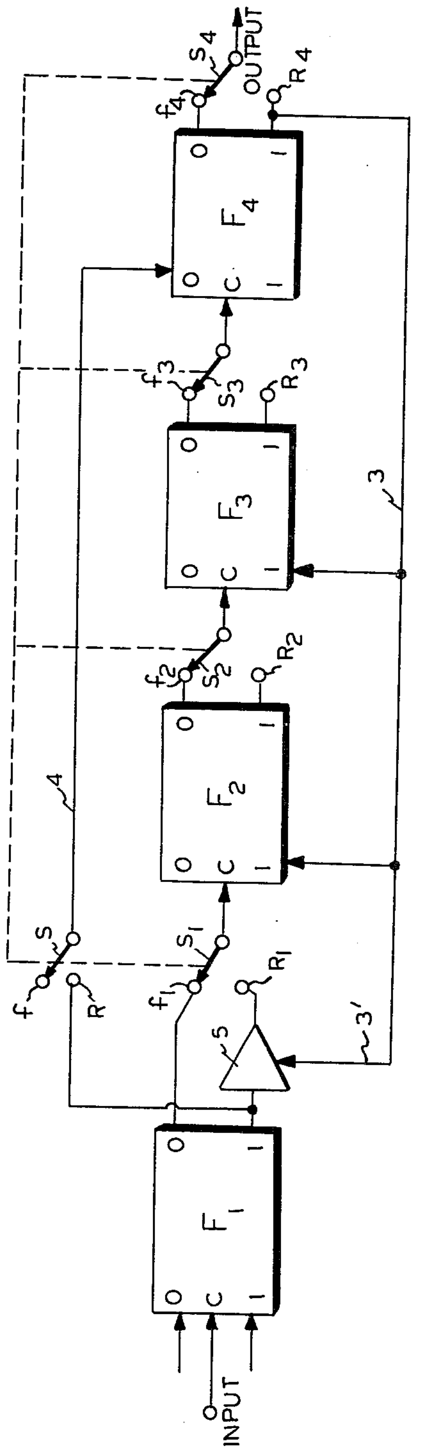
Figure 2A:
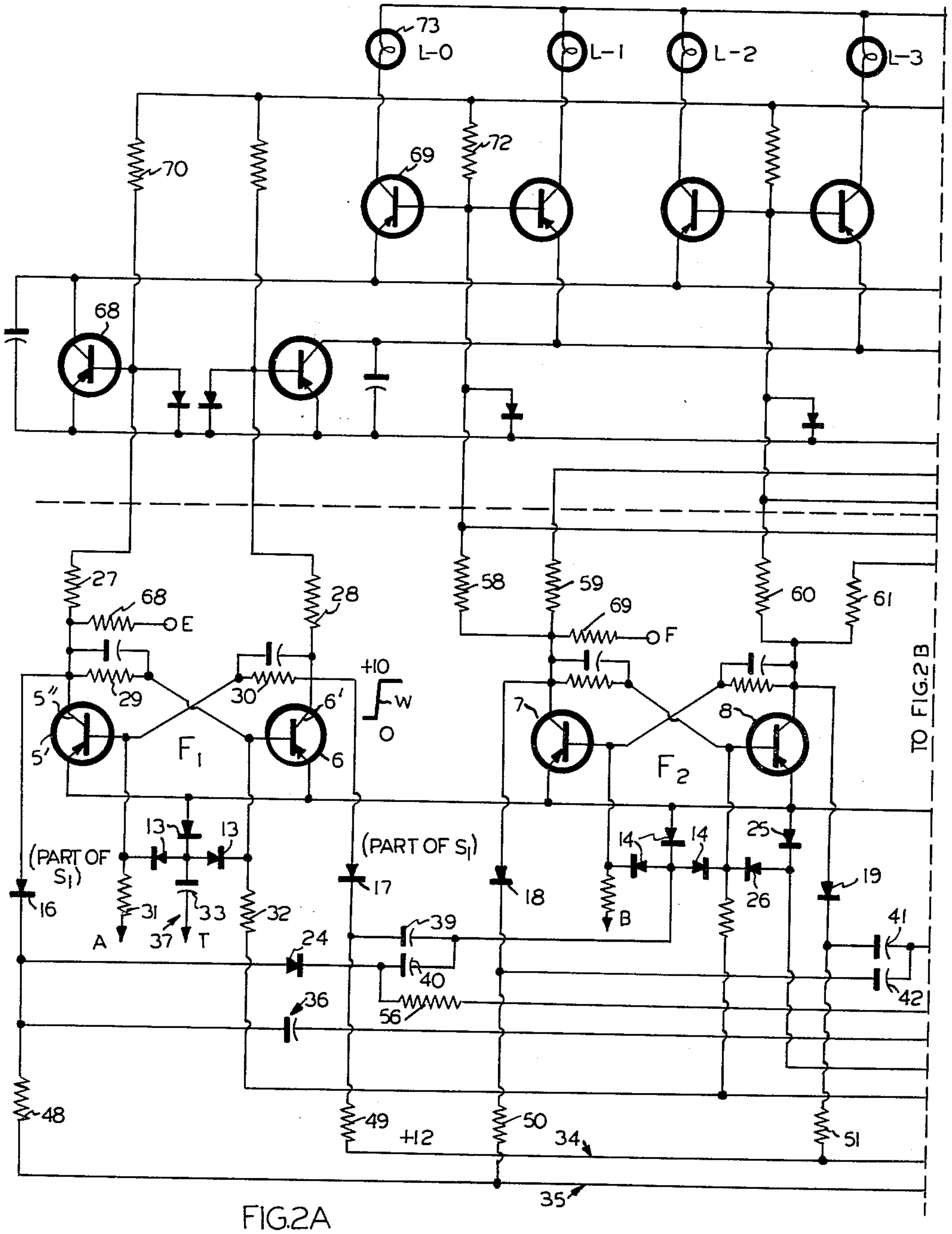
Figure 2B:
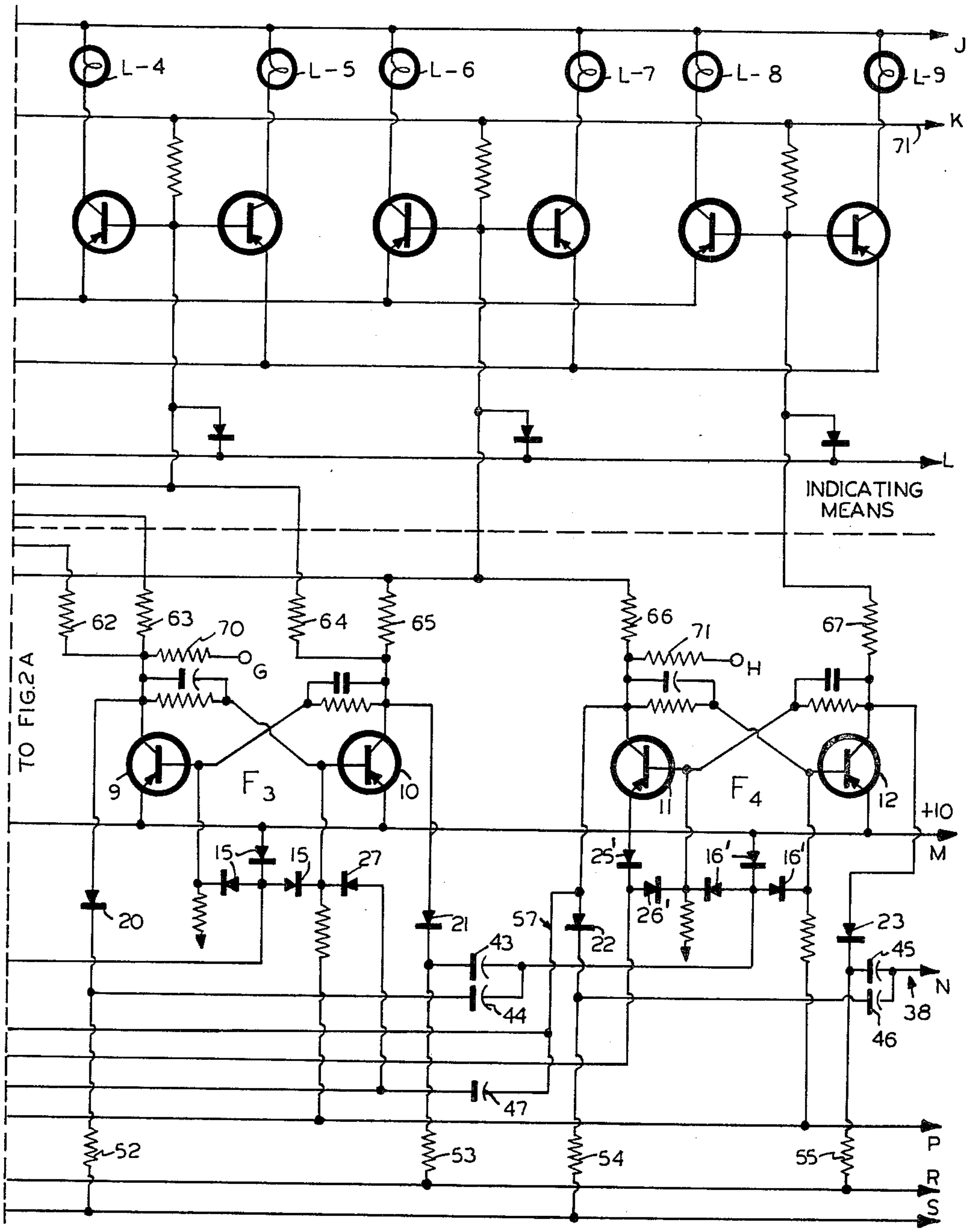
Figure 3:
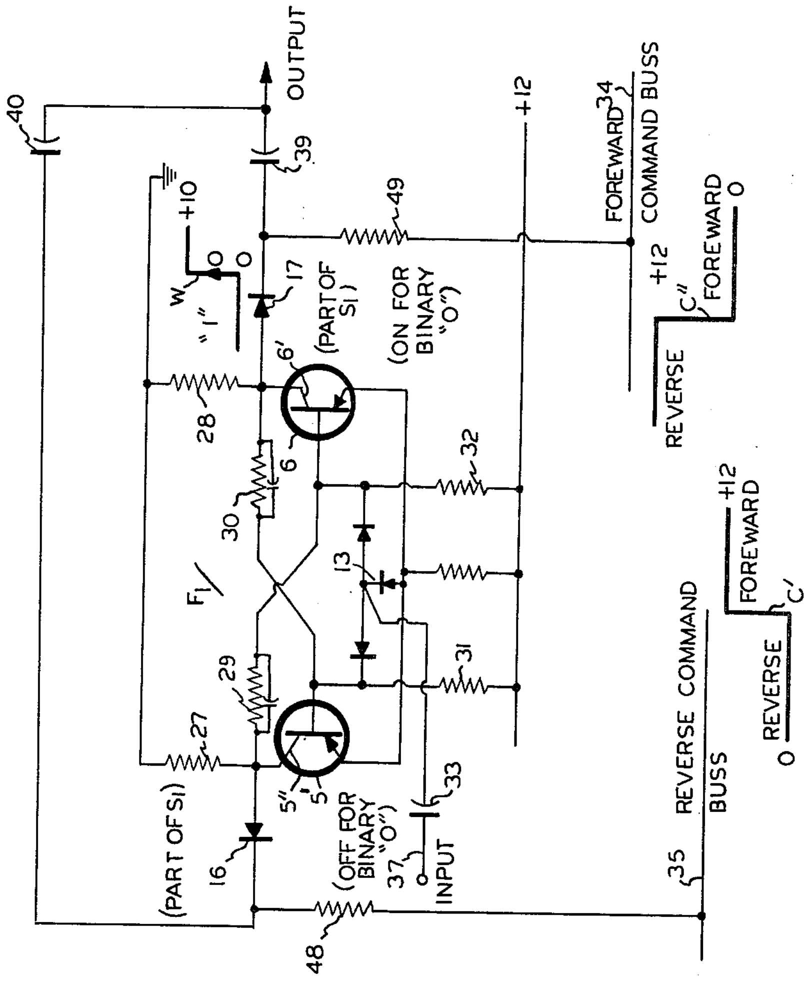
Figure 4:
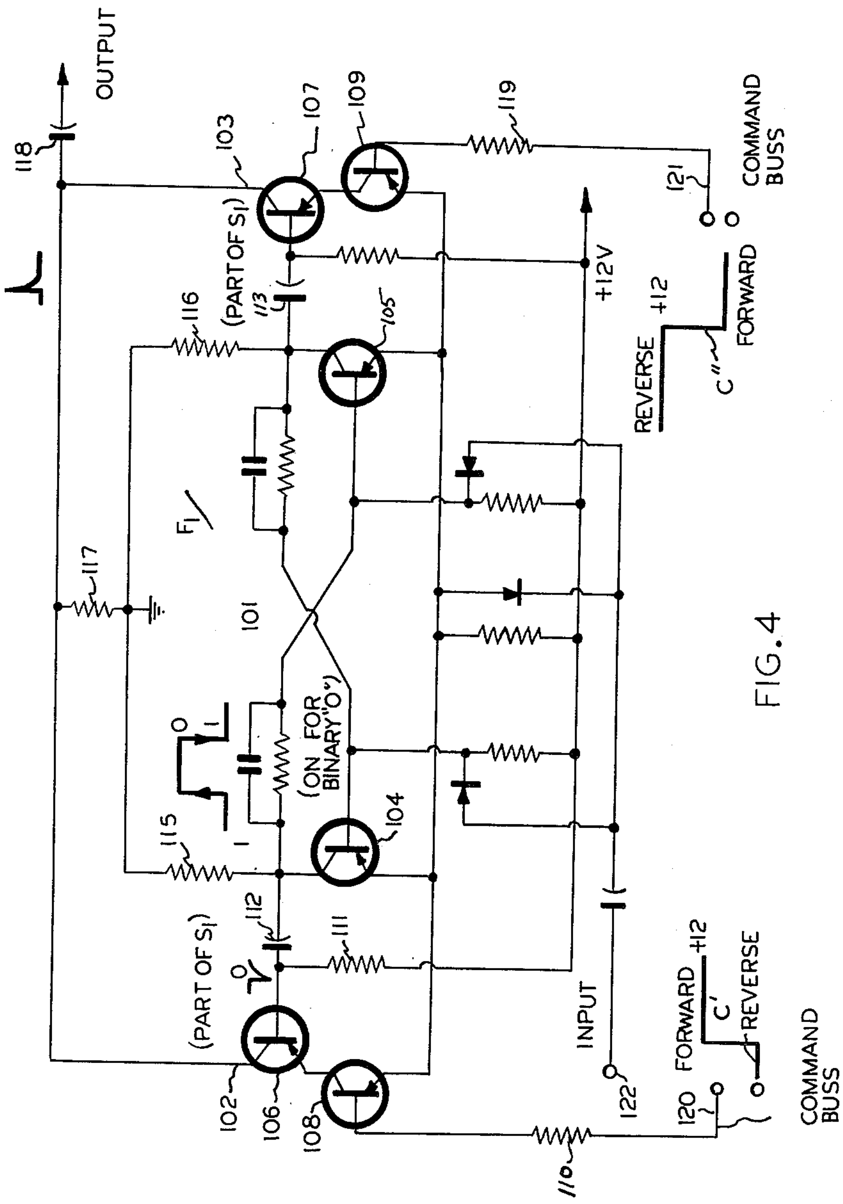

The invention will now be described in connection with the accompanying drawings, FIG. 1 of which is a schematic block diagram illustrating the invention in preferred form as applied to the preferred 1–2–4–2 weighting code;

FIG. 2A–B is a circuit diagram of detailed circuitry for the system of FIG. 1;

FIG. 3 is a schematic circuit diagram of a preferred carry switching circuit for relatively low-speed reversible counting; and FIG. 4 is a similar diagram for relatively high-speed carry switching.

Referring to FIG. 1, four conventional bistable flip-flop switching or counting stages or units are shown at $F_1$, $F_2$, $F_3$ and $F_4$, each provided with an input terminal C for enabling complementing of the same. (A flip-flop is said to complement when an input signal is so connected that upon its application it will cause the flip-flop to assume its opposite state; that is, if the number in the flip-flop before the application of the pulse is a "1" it will revert to "0" and vice-versa. Each flip-flop stage is shown provided with 0–1 output terminals, shown to the right. For the connections illustrated, the 0 output terminal of the first stage $F_1$ is serially conected to the input C of the stage $F_2$ through the forward-position switch terminal $f_1$ and switch contactor $S_1$. The 0 output terminals of the second and third stages $F_2$ and $F_3$ are similarly shown applied by respective terminals and switches $f_2$–$S_2$ and $f_3$–$S_3$ to the input C of the next succeeding stage, with the 0 output terminal of stage $F_4$ connecting through $f_4$ and $S_4$ to the ultimate "output." A feed-back path 3 is connected from the "1"-state output terminal of the fourth counting stage $F_4$ to each of the "1"-state input terminals of the second and third stages $F_2$ and $F_3$, to provide an appropriate feed-back signal for enabling forward counting in accordance with the 1–2–4–2 weighted code sequence described, for example, in United States Letters Patent No. 2,521,788, issued September 12, 1950 to I. E. Grosdoff.

The preferred predetermined forward counting sequence and weighting is shown in the following table:

I.

*Forward*

(1–2–4–2)

(Stage)

| | $F_1$ | $F_2$ | $F_3$ | $F_4$ |
|---|---|---|---|---|
| Impulse...0 | 0 | 0 | 0 | 0 |
| 1 | 1 ↓ | 0 | 0 | 0 |
| 2 | 0 | 1 | 0 | 0 |
| 3 | 1 ↓ | 1 ↓ | 0 | 0 |
| 4 | 0 | 0 | 1 | 0 |
| 5 | 1 ↓ | 0 | 1 | 0 |
| 6 | 0 | 1 | 1 | 0 |
| 7 | 1 ↓ | 1 ↓ | 1 ↓ f.b. | 0 |
| 8 | 0 | 0–1 ← | 0–1 ← | 1 |
| 9 | 1 | 1 | 1 | 1 |

The arrows indicate complementing from "1" to "0" states with the number of applied input impulses indicated in the first or left-most vertical column, and the state of each counting stage $F_1$, $F_2$, $F_3$, $F_4$ indicated in the succeeding vertical columns.

It will be observed that when the eighth input impulse occurs, the change in state of the fourth flip-flop stage $F_4$ resets the second and third stages $F_2$ and $F_3$ (which were set to 0) to the "1" state by means of the feedback connection 3, indicated by arrows "*fb*" in the above table. The decimal number "8" is thus represented by the binary number 0 1 1 1.

In accordance with the present invention, this precise same switching sequence, and hence the same weighting of the successive stages, occurring in the forward counting logic is attained in reverse counting. This may be effected by simultaneously setting the switches $S_1$, $S_2$, $S_3$ and $S_4$ (as by the dotted-line gang connection) to their respective $R_1$, $R_2$, $R_3$ and $R_4$ positions. In such positions, a gate or "and" circuit 5 becomes interposed between the "1"-state output terminal of the first switching unit $F_1$ and the complementing input terminal C of the second flip-flop stage $F_2$. The flip-flops $F_2$ and $F_3$ are then respectively connected from their "1"-state output terminals to the complementing input terminals C of the next-following stages $F_3$ and $F_4$. The output of the last stage $F_4$ is also taken from the "1"-state output terminal thereof.

The feed-back connection 3 of the forward counting connection may be left in place since, as will later be evident, it plays no part in the reverse counting operation; but it is extended at 3′ to provide one of the inputs for the gate circuit 5, the other input of which comes from the "1"-state output of the first flip-flop stage $F_1$. In addition, the "1"-state output terminal of the first switching unit $F_1$ is also connected (with switch S in position R) to the "0"-state input terminal of the fourth unit $F_4$ by conductor 4 to provide a structure that reversely counts in accordance wtih the same 1–2–4–2 weighting code of the forward counting connection of FIG. 1, and with precisely the identical switching sequence or code thereof.

This will be evident from the following table, employing the same transition arrow convention used before.

II.

*Reverse*
(1-2-4-2)

(Stage)

| Impulse | Decimal Number | $F_1$ | $F_2$ | $F_3$ | $F_4$ | Condition of Gate 5 |
|---|---|---|---|---|---|---|
| 0 | 9 | 1 | 1 | 1 | 1 | Closed. |
| 1 | 8 | 0 ↓ | 1 | 1 | 1 | Do. |
| 2 | 7 | 1 ⌐ | 1 | 1 | →0 | Opens. |
| 3 | 6 | 0 ↓ | 1 | 1 | 0 | |
| 4 | 5 | 1 | 0 | 1 | 0 | |
| 5 | 4 | 0 ↓ | 0 ↓ | 1 | 0 | |
| 6 | 3 | 1 | 1 | 0 | 0 | |
| 7 | 2 | 0 ↓ | 1 | 0 | 0 | |
| 8 | 1 | 1 | 0 | 0 | 0 | |
| 9 | 0 | 0 ↓ | 0 ↓ | 0 ↓ | 0 | |
| 10 | 9 | 1 | 1 | 1 | 1 | Closes. |

With the switches S, $S_1$, $S_2$, $S_3$ and $S_4$ of FIG. 1 in their respective R positions, a flip-flop transition from "0" to "1" will provide a complementing input to a succeeding flip-flop stage. Assuming, therefore, as shown in Table II, that the state of the counter represents decimal number "9," a first input pulse will simply complement the first flip-flop stage $F_1$, causing the decade to assume the binary equivalent of decimal number "8"; namely the binary number 0 1 1 1. Upon receipt of the next impulse, the first flip-flop stage $F_1$ goes from "0" to "1," and this transition sets the fourth flip-flop $F_4$, via conductor 4, from the "1" to the "0"-state. When the fourth flip-flop $F_4$ assumes the "0"-state, the gate 5, interposed between the first and second flip-flop stages $F_1$ and $F_2$, is opened. Succeeding "0-to-1" transitions of the first flip-flop $F_1$ will then complement the second flip-flop stage, $F_2$. Upon the receipt, therefore, of the fourth input pulse, the first flip-flop $F_1$ will make a "0-to-1" transition which will carry the second flip-flop $F_2$ from a "1"- to a "0"-state. The counting circuits will therefore register the binary equivalent of the decimal number "5"; i.e. 1 0 1 0. This will be observed to be identical to the decimal number "5" in the forward counting sequence, Table I.

Unlike the prior art Scollar and related circuits before discussed, therefore, there is complete identity between the switching sequences and weighting codes in both forward and reverse counting in the system of FIG. 1.

While, in the block diagram of FIG. 1, physical switches S, $S_1$, $S_2$, etc. have been schematically illustrated, in actual practice, these are preferably electrically operated switching devices, such as diode gates or the like. Thus, in FIG. 3, the first flip-flop stage $F_1$ comprises a pair of transistor amplifier relays 5′, 6 (PNP type transistors) and the switch $S_1$ corresponds to the pair of diode gates 16 and 17, as hereinafter explained, connected for the reverse counting operation (i.e. $S_1$ of FIG. 1, in position $R_1$). This circuit is suitable for relatively low-speed counting at a maximum rate of the order of 100 kilocycles per second and reversing at a rate of the order of 50 kilocycles per second. In FIG. 4, on the other hand, an alternative circuit configuration for the first stage $F_1$ is shown, adapted more particularly for higher speed counting and employing transistors 104 and 105 of, for example, the MADT type, with the diode switching gates 16 and 17 of FIG. 3 replaced by two-transistor "and" gates 107–109 and 106–108 that permit both counting and counting reversals at megacycle rates. In FIG. 2A–B, a complete circuit diagram of the system of FIG. 1, embodying flip-flop stages $F_1$–$F_4$ of the type shown in FIG. 3 is presented. Clearly, however, electron tubes and other relay and switching devices may obviously also be employed, if desired.

A prerequisite for forward counting (the addition of one decimal state for each input pulse) and for reverse counting (the subtraction of one state for each input signal) resides in the necessity to reverse the carry pulse upon transition of each flip-flop stage, so that when the carry is issued in forward counting, it will issue on a transition of a given flip-flop stage from the binary number "1" to the binary number "0." In reverse counting, the opposite takes place and the carry must be issued for subtraction upon the binary "0"-to-binary "1" transition. This actual switching is accomplished in the embodiments of FIGS. 2A–B and 3 by a pair of diode gates, such as the diode 16 for reverse counting in stage $F_1$ and the diode 17 for forward counting, connected with the respective collector electrodes 5″ and 6′ of the relays 5′ and 6. Since the flip-flop circuit 5′–6 is old in the art, there is no need to describe its full operation. Transistor 6 and, in fact, in FIG. 2A–B, all the even-numbered transistors 6, 8, 10 and 12 of respective flip-flop stages $F_1$, $F_2$, $F_3$ and $F_4$ will be "on" to represent the binary number "0." The transistor relays with odd numbers 5′, 7, 9 and 11, of respective stages $F_1$, $F_2$, $F_3$ and $F_4$ are "off" in the binary "0" state. As previously discussed, the output signal of each stage for complementing the next flip-flop stage of the counting chain in forward counting must be issued when flip-flop stage $F_1$ makes a transition from a "1" state (transistor 5′ "on"), to the "0" state (transistor 6 "on"). As shown by the waveform W at transistor 6, the collector voltage at 6′ will rise from zero to, say, +10 volts as the flip-flop stage $F_1$ goes from the "1" to the "0" state. This is a positive step of 10 volts in potential across resistor R28 at the collector junction. For forward counting, the forward command buss 34 will be at zero potential, so that when the collector 6′ of transistor 6 moves from zero to +10 volts, the diode 17 will conduct and a positive step in voltage will occur across resistor 49, connected to the diode 17. This positive step of voltage is coupled by capacitor 39 to provide an input signal for the second flip-flop stage $F_2$. These then, are the conditions in forward counting.

In order to count in reverse, the forward command buss 34 is raised from zero to +12 volts, for example. Diode 17 can therefore conduct on neither transition of transistor 6. At the same time, the reverse command buss 35 is lowered from +12 to zero volts, and diode 16 is therefore rendered conductive to pass a positive pulse when transistor 5′ turns on. This is the desired "0–1" transition for a carry. On this "0–1" transition, when transistor 5′ goes on, diode 16 will conduct and pass, via capacitor 40, the positive output pulse necessary to complement flip-flop state $F_2$.

In the actual operation of this forward or reverse counting decade, forward command buss 34 and reverse command buss 35 are operated by a fast electronic switch, usually a conventional flip-flop in itself, which feeds forward-reverse step waveforms C′ and C″, FIG. 3, to all four of the flip-flops $F_1$–$F_4$ of the decade and all other decades that may be involved in the equipment.

The embodiment of FIG. 3 is satisfactory for lower-speed counting, as before explained, the rate at which it can reverse from forward counting to reverse counting being determined by the time necessary to charge capacitors 39 and 40 through resistors 48 and 49 upon a reverse-to-forward, or forward-to-reverse, command voltage C′ or C″.

The embodiment shown in FIG. 4, on the other hand, wherein a 2-transistor "and" gate is used to provide forward or reverse output carry pulses, will greatly increase the speed of operation. In FIGURE 4, the conduction or turning on of transistor 104 of flip-flop $F_1$ represents the "0" binary state. The output of this transistor is coupled by a capacitor 112 to the base of transistor 106. When the flip-flop 104–105 makes a "0-to-1" transition, the base of transistor 106 will be driven negative. If transistor 108 is on, it will then conduct to provide a positive output pulse, developed across resistor 117, to the output at capacitor 118. Transistor 108 must, therefore, be turned on in order for this "0-to-1" transition of flip-flop $F_1$ to provide a carry for reverse counting. The base of transistor 108 must therefore be forward-biased by changing the potential at conductor 120 to zero potential for reverse counting.

In a like manner, to provide for forward counting, transistor 108 will have its base potential moved to +12 volts, which will terminate its conduction or turn it off; and transistor 109 will have its base potential changed to zero volts, which will turn it on. When flip-flop transistor 105 turns off, accordingly, the "1–0" transition will produce a negative pulse through capacitor 113 to cause transistor 107 to conduct and to issue an output pulse for forward counting at capacitor 118. In this circuit, therefore, the carry outputs at capacitors 112 and 113 to their respective transistors 106 and 107 are completely isolated from the forward and reverse command buss voltages C′ and C″ at buss conductors 120 and 121, operating on transistors 108 and 109 through resistors 110 and 119. There is, therefore, no intercoupling capacitance and a much higher possible speed of reversal command.

Returning, now, to FIG. 2A–B, when the forward command buss 34 is set at zero potential and the various diode gates are biased to provide for forward counting, the reverse command buss 35 will have a potential of +12 volts impressed through resistors R48, R50, R52 and R54 to keep diodes 16, 18, 20 and 22 all reverse biased. Let it be assumed that the decade has previously been set to represent the decimal number zero. Transistor 6 of flip-flop $F_1$, transistor 8 of flip-flop $F_2$, transistor 10 of flip-flop $F_3$ and transistor 12 of flip-flop $F_4$ are thus conducting. Upon the application of an input pulse at point 37, flip-flop $F_1$ will be driven to the "1" state, transistor 6 going off and transistor 5 going on. As transistor 6 goes off, the potential at its collector 6′ falls to approximately zero volts from approximately 10 volts, and a negative step is applied at diode 17, the cathode of which previously set at +12 volts. No change occurs, then, across resistor R49. On the application of this pulse, therefore, only the first flip-flop stage $F_1$ changes its state.

The second pulse impressed at input terminal 37 will turn transistor 5′ off and transistor 6 back on again. The first flip-flop $F_1$ thus reverts to the "0"-state. As transistor 6 goes on, the voltage at the anode of diode 17 goes from zero to +10 volts, producing a positive pulse that is impressed through capacitor 39 to diodes 14, FIG. 2A, complementing the second stage $F_2$. Transistor 8 then goes off and transistor 7 conducts. Since the +12 volts of C″ of the forward command buss 34 is impressed via resistor 51 upon diode 19, the situation is exactly the same as for the first stage $F_1$ and no carry signal is produced for the third stage $F_3$. The states of the four stages $F_1$–$F_4$ are now, therefore, in condition to represent the decimal number "2" (i.e. 0100).

The third input pulse will simply reverse the state of the first stage $F_1$ again. On the application of the fourth input pulse, the first stage $F_1$ is complemented from 1 to 0, carrying to the second stage $F_2$ which is complemented from 1 to 0. The second stage $F_2$, via diode 19 and capacitor 41, complements the third stage $F_3$, and the state of the decade is now 0010.

The fifth pulse simply complements the first stage $F_1$ again, producing the binary number 1010. On the application of the sixth pulse, the complementing of the first stage $F_1$ carries to the second stage $F_2$, which makes a "0–1" transition and produces the binary number 0110, representing the decimal number "6." The application of the seventh pulse again complements the first stage $F_1$ producing state 1110. Upon the application of the eighth input pulse, the first stage $F_1$ is moved from 1 to 0, carrying to the second stage $F_2$. The second stage $F_2$ changes from "1" to "0," carrying to the third stage $F_3$, which changes from "1" to "0," also, by way of the "one" diode 21 and capacitor 43, FIGS. 2A–B. The fourth stage $F_4$ is thus complemented. At this point the decade temporarily has the state 0001. When the fourth stage $F_4$ makes its transition from "0" to "1," however, the ongoing collector of transistor 11 produces a positive signal in conductor 57, which, by way of capacitor 47 and diodes 26 and 27 is coupled to the bases of transistors 8 and 10 of respective flip-flop stages $F_2$ and $F_3$, turning these transistors off. Stages $F_2$ and $F_3$ are therefore set to the "1" state. This feedback signal finally results in the state 0111.

The ninth input pulse simply complements the first stage $F_1$, and the number 9 is thus represented by 1111. Upon the applicaton of the tenth pulse, the first stage $F_1$ is complemented, going from "1" to "0," carrying to the second stage $F_2$, which complements from "1" to "0" and carries to the third stage $F_3$, complementing the same from "1" to "0," and carrying to the fourth stage $F_4$. The fourth stage $F_4$ complements from "1" to "0," also, so that the state of the decade is again 0000, completing the sequence of Table I. As the fourth stage $F_4$ makes this transition from "1" to "0," a carry pulse is produced to feed succeeding decades or output circuitry. This carry pulse is produced for the forward counting condition by diode 23 energized through resistor 55 from the forward command buss 34. The output signal is applied through capacitor 45.

In order to cause this decade structure to count with the same coding in reverse, the forward command buss 34 is raised from zero volts to +12 volts, turning off diodes 17, 19, 21 and 23. The reverse command buss 35 is lowered in potential from +12 volts to 0 volts, C′, rendering diodes 16, 18, 20 and 22 conductive. If it be assumed that the decade is in the zero position, as at the beginning of the description of the forward counting arrangement, then upon receipt of the first pulse at input terminal 37, the first stage $F_1$ will cause complementing from the binary "0" to the binary "1" state and transistor 5 goes on. The positive voltage transition as transistor 5 conducts is coupled by diode 16 and develops a positive pulse across resistor 48. Since all four stages $F_1$, $F_2$, $F_3$ and $F_4$ are in the "0" state, transistor 11 of the fourth flip-flop stage $F_4$ is not conducting and its collector is at approximately zero-volt potential. This potential is applied via resistor 56 to the cathode of diode 24, and diode 24 is therefore in the conductive condition and will pass the positive pulse developed across resistor R48 to capacitor 40. Capacitor 40 couples the pulse to the complementing diodes 14 to cause flip-flop stage $F_2$ to complement. $F_2$ therefore changes to a "1"-state, transistor 7 conducts, and stage $F_2$ produces a positive pulse through diode 18, developed across resistor 50 and coupled through capacitor 42 to complement stage $F_3$ to a "1"-state. Again, as stage $F_3$ goes from "0"–to–"1," transistor 10 switches off, transistor 9 turns on, and, by way of diode 20 and capacitor 44, stage $F_4$ is set to the "1"-state. Upon the application of this first pulse, the decade has gone from 0000 to 1111 (Table II) and the state has reverted from the decimal number "0" of the forward counting operation of to the decimal number "9" of that operation. When transistor 11 of stage $F_4$ conducts, its collector becomes positive and this positive voltage is applied along resistor 56 to turn diode 24 off so that no further positive pulses can be passed to capacitor 40 and the second stage $F_2$. Note, also, that energizing the reversal command buss 35 has forward biased diode 22 so that when transistor 11 of the fourth stage $F_4$ conducts, a positive pulse is applied by way of diode 22, developed across a resistor 54, and passed through capacitor 46 as the carry pulse at point 38, being the output (or carry) pulse of the decade for reverse counting.

Application of a second pulse to this reverse-count configuration will move the count from "9" to "8" because the first stage $F_1$ only will be complemented. The "0"–to–"1" transition, which is a negative transition at the collector of transistor 5', is not passed through diode 16 to any succeeding stage. The application of this pulse, therefore, will cause the state of the decade to be 0111, Table II; i.e., precisely the same binary state as that for forward counting to represent the decimal number "8," Table I. Application of the third pulse will complement the first stage $F_1$ again from a "0" to "1,". The positive pulse developed at the collector of transistor 5' will be conducted by diode 16 and developed across resistor 48 to produce a positive pulse which, in turn, is applied through capacitor 36 to turn off transistor 11 of the fourth stage $F_4$, through diodes 25' and 26'. When transistor 11 goes off, transistor 12 of the fourth stage $F_4$ conducts, and the state of the four stages $F_1$–$F_4$ is now 1110.

When transistor 11 goes off and transistor 12 goes on, to represent the "0"-state of the fourth stage $F_4$, conductor 57 again goes positive and diode 24 is turned on, so that succeeding "0"–to–"1" transitions of the first stage $F_1$ will be conducted through diodes 16 and 24 and through capacitor 40 to the second stage $F_2$. The application of the fifth pulse to the decade will simply cause the first stage $F_1$ to complement, so that the decimal number "6" is represented by 0110, again, identical to the binary number "6" in the forward counting operation, Table I. On this transition, since the collector of transistor 5 goes negative, no carry pulse is issued. The application of the next or sixth input pulse causes stage $F_1$ to complement from "0" to "1," with the resulting positive transition at the collector of transistor 5 being coupled by diode 16 and diode 24 through capacitor 40 to complement the second stage $F_2$ from the "1"–to–"0" stage. As the collector of transistor 7 goes negative, no signal is issued from diode 18, and the third stage $F_3$ remains in its "1"-state. The decimal number "5" is therefore represented by 1010, Table II, again identical to the decimal number "5" under the forward counting conditions, Table I.

The next pulse simply again complements the first stage $F_1$ and the decimal number "4" results; i.e. 0010. On the application of the next pulse, the first stage $F_1$ is complemented from "0" to "1," carrying to the second stage $F_2$ and complementing the same from "0" to "1." The positive-going signal at the collector of transistor 11 is then coupled by diode 18 and capacitor 42 and through the complementing diodes 15 of stage $F_3$, causing stage $F_3$ to change from the "1" to the "0"-state. The decimal number "3" is accordingly represented by 1100, which is also the identical binary number representing the decimal number of the forward counting case.

Upon the application of the next pulse, the first stage $F_1$ simply complements and issues no signal during its "1"–to–"0" transition. Upon the application of the next pulse, however, the first stage $F_1$ complements from "0" to "1," carrying to the second stage $F_2$ which complements from "1" to "0," and produces the binary number 1000, representative of the decimal number "1." The application of the tenth pulse then complements the first stage $F_1$, and the binary number 0000, representative of the decimal number zero, occurs. The decade has now counted through and back to its initial condition so that, upon the application of the next pulse, the situation will repeat.

A structure has thus been realized which, by using a combination of feedback for the forward case and gating by diode 24 and resistor 56 in the reverse case, yields an identical binary "0–1" structure in both forward and reverse counting directions. Since the same binary states representative of the decimal numbers exist either counting forward or counting in reverse, there is no further complication in connecting the counting device to an indicating means, so labelled and above the dotted line in FIG. 2. In this embodiment, it is desired to light an incandescent indicator lamp that will represent the decimal number contained in the binary counting system. The decimal number "0," for example, represented by transistors 6, 8, 10 and 12 being "on" in the counting decade, will cause transistors 68 and 69 in the indicator-driver unit of FIG. 2A–B to conduct. Transistor 68 will be on for any even number, since transistor 5' is off and no current is drawn in resistor 27. Transistor 68 will, therefore, be forward-biased to a voltage, say −10 volts, on buss conductor 71. Transistor 69 will be on because transistors 7 and 9 of stages $F_2$ and $F_3$ are off and there is no current in resistors 58 and 62. The base of transistor 69 will thus be forward-biased by the current flowing in resistor 72 to buss conductor 71. Since transistors 68 and 69 are on, the zero indicator lamp L–0 will be lit. Similar remarks apply to the similar circuits driving indicator lamps L–1 through L–9.

It is to be understood, of course, that many other indicating means are possible. All of the wires crossing the dotted line to the indicating means of FIG. 2, for example, could be grounded and the binary information could be read or indicated from the counting means through the voltages appearing at resistors 68, 69, 70 and 71 applied to a printer or any other conventional means of driving an indicator. Since in either forward or reverse counting exactly the same structure of 0's and 1's occurs (that is, all of the reverse or forward programming is done in the counting decade itself), any indicating, printing, or other data output indicating means can be conveniently driven by this form of forward or backward counting decade.

Further modifications will also occur to those skilled in the art and all such are considered to fall within the spirit and scope of the invention as defined in the appended claims.

What is claimed is:

1. A reversible counting circuit having, in combination, four binary stages interconnected by switching means, feed-back connections between the fourth and the second and third of said stages for establishing a predetermined forward counting sequence with the switching means in one condition, means for reversing the counting with same sequence and with the switching means in another condition comprising a gate circuit interposed between the first and second of the said stages and a feedback connection from the fourth of said stages to the gate circuit, and means for connecting the first to the fourth of said stages.

2. A reversible counting circuit as claimed in claim 1 and in which the forward and reverse counting sequence code is 1242.

3. A reversible counting circuit as claimed in claim 1 and in which the switching means is electrically operable between two different conditions in response to two different electrical command signals.

4. A reversible counting circuit as claimed in claim 3 and in which each binary stage is provided with "0"- and "1"-state output terminals to which the switching means are alternately connected in response to the said two different electrical command signals.

5. A reversible counting circuit as claimed in claim 4 and in which the switching means comprises diode means connected with the said "0"- and "1"-state output terminals.

6. A reversible counting circuit as claimed in claim 4 and in which the switching means comprises transistor means connected with the said "0"- and "1"-state output terminals.

7. A reversible counting circuit as claimed in claim 6 and in which each transistor means comprises a pair of interconnected transistors, one connected to one of the "0"- and "1"-state output terminals and the other to means for applying one of the said electrical command signals.

8. A reversible counting circuit as claimed in claim 1 and in which the four stages are represented by $F_1$, $F_2$, $F_3$ and $F_4$ and have identical forward and reverse counting "0"- and "1"-states as follows:

FORWARD

| Applied Impluse No. | $F_1$ | $F_2$ | $F_3$ | $F_4$ |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 1 | 1 | 1 |
| 9 | 1 | 1 | 1 | 1 |
| 0 | 0 | 0 | 0 | 0 |

REVERSE

| Applied Impluse No. | $F_1$ | $F_2$ | $F_3$ | $F_4$ |
|---|---|---|---|---|
| 9 | 1 | 1 | 1 | 1 |
| 8 | 0 | 1 | 1 | 1 |
| 7 | 1 | 1 | 1 | 0 |
| 6 | 0 | 1 | 1 | 0 |
| 5 | 1 | 0 | 1 | 0 |
| 4 | 0 | 0 | 1 | 0 |
| 3 | 1 | 1 | 0 | 0 |
| 2 | 0 | 1 | 0 | 0 |
| 1 | 1 | 0 | 0 | 0 |
| 0 | 0 | 0 | 0 | 0 |
| 9 | 1 | 1 | 1 | 1 |

9. A reversible counting circuit having, in combination, four bistable stages, means including switching means electrically operable between two different conditions in response to two different electrical command signals for interconnecting the stages to provide in one of the said two conditions a predetermined switching sequence of the stages, means for applying impulses to the stages to permit forward counting in accordance with the said sequence, means for reversing the counting of the stages comprising means for modifying the first-named interconnecting of the stages with the switching means in the other of the said two conditions to produce a different interconnection providing the same predetermined switching sequence in order that impulses fed to the stages at the applying means will permit counting in both the forward and reverse directions in decimal numbers that are represented by the same binary states in both counting directions, each bistable stage being provided with "0"- and "1"-state output terminals to which the switching means are alternately connected in response to the said two different electrical command signals, the said different interconnections under the control of the switching means comprising a gate circuit introduced between the first and second stages, a feedback connection from the fourth stage to the gate circuit, and a feed-forward connection from the first to the fourth stage.

10. A reversible counting circuit having, in combination, a plurality of bistable stages, means for interconnecting the stages to provide a predetermined switching sequence of the states of the stages with a predetermined assigned weighting factor for each successive stage, means for applying impulses to the stages to permit forward counting in accordance with the said sequence, means for reversing the counting of the stages comprising means for modifying the first-named interconnecting of the stages to produce a different interconnection providing the same predetermined switching sequence of the states of the stages with each stage having the same weighting factor assigned to it as in the said forward counting in order that impulses fed to the stages at the applying means will permit counting in both the forward and reverse directions in decimal numbers that are represented by the same binary states in both counting directions, said modifying means comprising means for introducing a gate circuit between two of said stages, means for opening and closing the gate circuit upon predetermined counting conditions during reverse counting, and means for establishing a feed-forward connection from one of said stages to another stage.

11. A reversible counting circuits as claimed in claim 10 and in which there are four bistable stages and the code of the switching and weighting sequence thereof is 1242 in both forward and reverse counting directions.

12. A reversible counting circuit as claimed in claim 10 and in which said means for interconnecting the stages and means for modifying the interconnecting comprises switching means electrically operable between two different conditions in response to two different electrical command signals, each bistable stage being provided with "0"- and "1"-state output terminals to which the switching means are alternately connected in response to the said two different electrical command signals.

13. A reversible counting circuit as claimed in claim 12 and in which the switching means comprises transistor means connected with the said "0"- and "1"-state output terminals, each transistor means comprising a pair of interconnected transistors, one connected to one of the "0"- and "1"-state output terminals and the other to means for applying one of said electrical command signals.

14. A reversible counting circuit as claimed in claim 10 and in which said means for opening and closing the gate circuit comprising a feed-back connection from one of said stages to said gate circuit.

References Cited by the Examiner

UNITED STATES PATENTS 2,880,934 4/1959 Bensky et al. ........ 328—44 X

OTHER REFERENCES

Pub. I. "An Economical Reversible Transistor Decade Counter," by Scollar in Electronic Engineering Ltd., Sept. 1961, pages 597–599.

ARTHUR GAUSS, *Primary Examiner.*